Nov. 26, 1935.  V. K. ZWORYKIN  2,021,907

METHOD OF AND APPARATUS FOR PRODUCING IMAGES OF OBJECTS

Filed Nov. 13, 1931

INVENTOR.
Vladimir K. Zworykin,
BY R. Goldsborough
HIS ATTORNEY.

Patented Nov. 26, 1935

2,021,907

UNITED STATES PATENT OFFICE 2,021,907

METHOD OF AND APPARATUS FOR PRODUCING IMAGES OF OBJECTS

Vladimir K. Zworykin, Haddonfield, N. J., assignor to Radio Corporation of America, a corporation of Delaware Application November 13, 1931, Serial No. 574,772

4 Claims. (Cl. 178—6)

My invention relates to improvements in methods of and apparatus for producing images of objects or phenomena which are invisible to the human eye.

In bacteriological work, for example, it is known that there are bacteria which cannot be seen with a microscope regardless of the degree of magnification. This is attributed to the fact that the wave length of the light used heretofore is of the same order or greater than the size of these bacteria. Recourse has, accordingly, been made to the use of ultra-violet rays of a wave length smaller than the size of the bacteria, and an ultra-violet light image of the bacteria projected on a photographic plate. This method is not entirely satisfactory, since it is quite difficult to photograph phenomena which cannot be observed. Furthermore, the bacteria or other objects can be observed only indirectly, that is, by studying the developed photographic plates.

With the foregoing in mind, it is one of the objects of my invention to provide an improved method whereby it is possible to obtain directly an image of objects so small that it has not been possible to observe them directly by the methods and apparatus proposed heretofore.

Another object of my invention is to provide improved apparatus from which a moving image can be developed and observed directly of an object whose size is of the order of the wave length of ultra-violet light.

Other objects and advantages will hereinafter appear.

In accordance with my invention, an ultra-violet light image of an object, such as bacteria whose size is of the order of the wave length of ultra-violet light, is developed and utilized to develop a corresponding electrical image, the electrical image is scanned to develop picture signals, and these signals are supplied to a transmitting system.

More particularly, in accordance with my invention, a moving image is produced of an object, whose size is of the order of the wave length of ultra-violet light, by projecting a magnified ultra-violet light image of the object on photo-sensitive structure, scanning this structure with a cathode ray to develop picture signals, and supplying these signals to a transmitting system.

My invention resides in the method, system and apparatus of the character hereinafter described and claimed.

Figure 1:
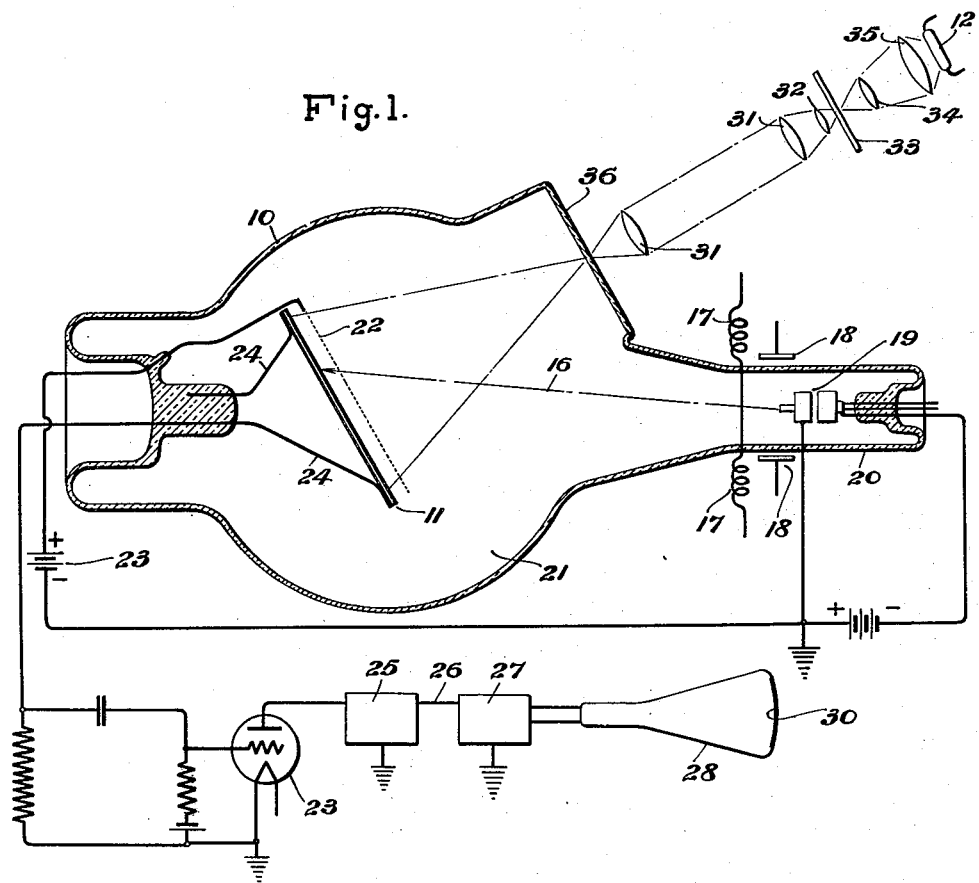
Figure 2:
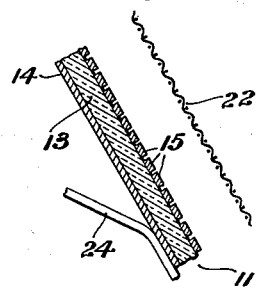

For the purpose of illustrating my invention, an embodiment thereof is shown in the drawing, wherein Fig. 1 is a diagrammatic view of a system embodying my invention; and Fig. 2 is an enlarged fragmentary sectional view, of a portion of the apparatus shown in Fig. 1.

A practical embodiment of my invention, as shown in Fig. 1, comprises cathode ray apparatus, designated generally by the reference numeral 10, and having screen structure 11, upon which is projected an image of the object which is illuminated by ultra-violet light from a suitable source, such as a quartz mercury tube 12.

The screen structure 11 is of the same general type, and operates on the same principle as those disclosed in my copending applications, bearing Serial Nos. 448,834 and 468,610, and filed May 1, 1930 and July 17, 1930, respectively.

With reference to Fig. 2, this structure may comprise, specifically, a relatively thin sheet 13 of mica having deposited on one side thereof a thin film 14 of platinum. On the other side of the mica sheet are individual photosensitive elements 15, uniformly distributed over the surface. For the purpose of making these elements, it is proposed to place a suitable mask against this side of the mica sheet, and, with the assembly in a vacuum, evaporate cadmium to cause the individual elements 15 of this material to be deposited at the openings in the mask. As an alternative, a continuous film of cadmium may be applied to the mica sheet and scratched through in a ruling machine to form the individual elements 15, insulated from each other and from ground. Instead of cadmium; uranium, thorium, cerium or any other suitable photosensitive material, particularly sensitive to ultra-violet light, may be used. Some of the alkalis, such as lithium and sodium, are also suitable for the photosensitive material. The alkali metals can be in pure form, or in oxide form, such as is used in the preparation of the caesium oxide photocell.

When the light image is projected on the photosensitive surface comprised of the elements 15, the individual elements emit electrons and take on positive charges corresponding in value to the light intensities to which they are subjected. An electrical image of the object, in the form of electrostatic charges over the surface of the screen structure 11, is thereby developed.

For the purpose of utilizing the electrical image referred to in reproducing, at a receiving station, a visible image of the object, the electrostatic charges referred to are neutralized or discharged successively by causing a cathode ray 16 to scan the photosensitive surface, for which purpose the ray is deflected horizontally in the usual manner by electromagnetic coils 17, and is deflected vertically by electrostatic plates 18. The ray 16 of electrons is developed by an electron gun 19 of usual construction supported in an elongated portion 20 extending from the bulb portion 21 of the tube 10.

For the purpose of removing the electrons of the ray 16 which are not required to neutralize the respective positive charges accumulated by the individual elements 15, as well as the electrons emitted by these elements in taking on these charges, a suitable collector 22, in the form of a screen, is supported in proximity to the photosensitive surface of the screen structure 11, and is maintained at a positive potential by a battery 23, leading to ground, as shown.

The successive discharge of the positive charges on the individual elements 15, as explained, causes corresponding current impulses or picture signals to be developed in the grid circuit of a suitable amplifier tube 23, for which purpose the platinum film 14 is connected to this circuit by way of one of the wire supports 24 carrying the screen structure 11.

The amplified picture signals are supplied to a suitable transmitting system 25 and over a connection 26 to a suitable receiving system 27, to which a cathode ray receiving tube 28 is connected.

The receiving system 27, which includes the tube 28, may be of the same general type described in detail in the copending application by Arthur W. Vance, bearing Serial No. 544,959, filed June 17, 1931, and assigned to the Radio Corporation of America. In operation, a moving image of the object is reproduced on the usual fluorescent screen 30 on the large end of the tube 28.

The light image of the object may be projected on the photosensitive surface 15 by any suitable form of microscope, shown diagrammatically as comprising quartz lenses 31 and 32, a quartz slide 33 containing the object, such as bacteria, and other quartz lenses 34 and 35 effective to focus the ultra-violet light from the source 12 upon the object. The tube 10 may be of glass, and provided with a suitable quartz or fused silica window 36 to admit the ultra-violet light, or the entire tube, or at least the entire bulb portion 29, may be made of quartz for this purpose.

From the foregoing it will be seen that by my improved method and system, it is possible to view moving images of objects which heretofore have been invisible on account of their size.

While my present improved system has been described more in connection with the observation of bacteria and other objects whose size is of the order of the wave length of ultra-violet light, the system is equally effective for the purpose of observing phenomena such as gas discharge, electric sparks, secondary emission under ultra-violet and X-ray radiation, and the effect of the so-called Lenard rays on different materials.

I claim as my invention:

1. The method of producing an image of an object whose size is of the order of the wave length of ultra-violet light, which comprises projecting a magnified image of the object illuminated by ultra-violet light on photosensitive structure, scanning said structure with a cathode ray to develop picture signals, and supplying said signals to a television receiving system.

2. In a system for producing an image of an object whose size is of the order of the wave length of ultra-violet light; cathode ray apparatus comprising a tube provided with a quartz window, screen structure disposed in said tube and having a photosensitive surface facing said window, means for developing a ray of electrons and directing the same at said structure, and means for causing said ray to scan said structure; a source of ultra-violet light, an optical system of quartz interposed between said source and said window and operable to project a magnified ultra-violet light image of the object on the photosensitive surface of said structure, and a television receiving system having its input circuit connected to said apparatus.

3. The method of observing minute objects whose diameters are of the order of the wavelength of ultra-violet light which comprises illuminating the objects with ultra-violet light, forming an optically invisible image of the objects, deriving an electrical image from the optically invisible image, utilizing the electrical image to produce a train of electrical impulses, translating the electrical impulses into an optically visible image, and adjusting the image-forming elements until the optically visible image is clear and distinct.

4. The method of observing the instantaneous condition of bacteria and the like whose diameters are of the order of the wave length of ultra-violet light, which comprises illuminating the objects with ultra-violet light, forming an optically invisible image of the objects, utilizing the optically invisible image to produce an electrical image, utilizing the electrical image to produce a train of electrical impulses, and translating the electrical impulses into an optically visible image, whereby living bacteria may be studied while irradiated with light that will ultimately kill them.

VLADIMIR K. ZWORYKIN.